July 19, 1932. H. J. FRELIN 1,868,007
LOCK NUT
Filed June 7, 1929 2 Sheets-Sheet 2
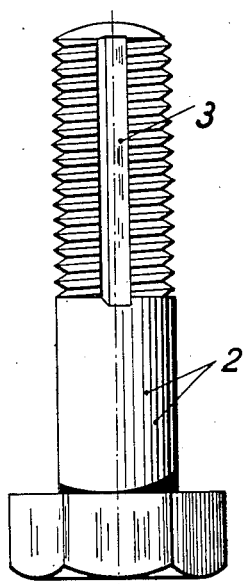
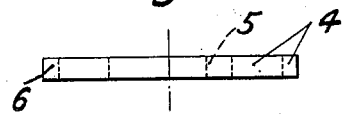
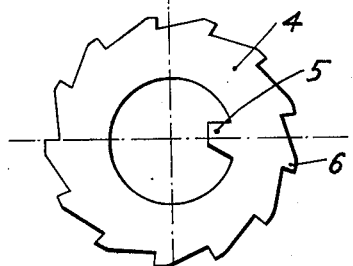
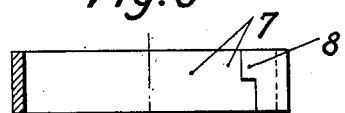
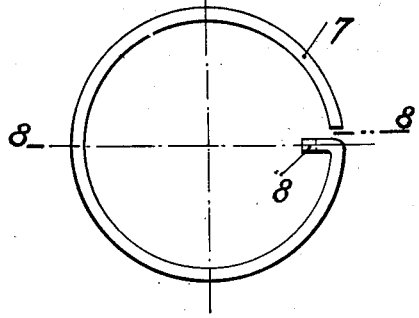
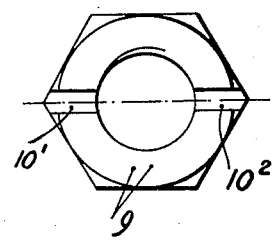
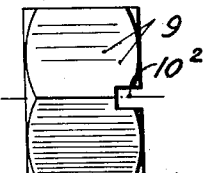

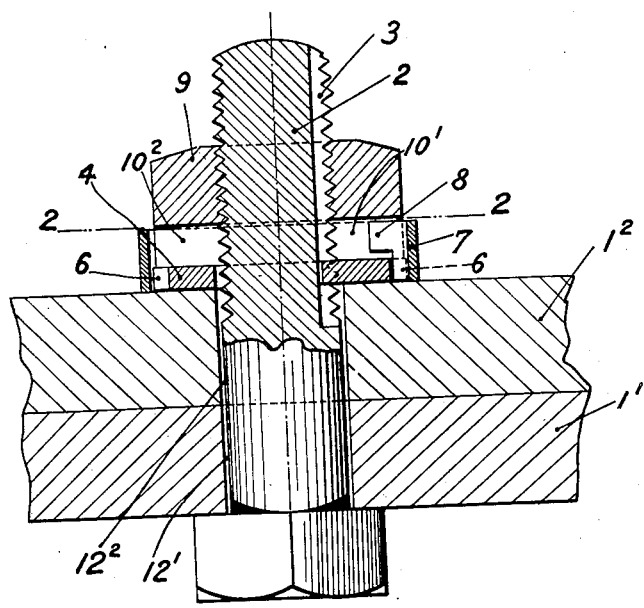
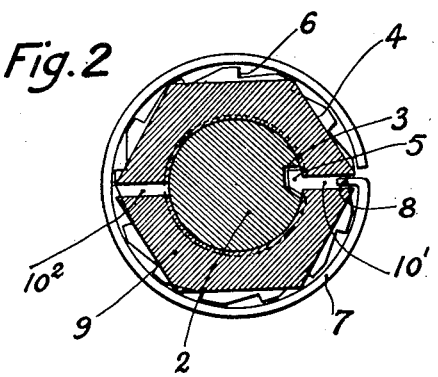

Patented July 19, 1932

1,868,007

UNITED STATES PATENT OFFICE

HENRI JOSEPH FRELIN, OF BELFORT, FRANCE, ASSIGNOR TO SOCIÉTÉ ANONYME "L'ECROU INDESSERABLE REX," OF BELFORT, FRANCE, A LIMITED JOINT STOCK COMPANY OF FRANCE

LOCK NUT

Application filed June 7, 1929, Serial No. 369,247, and in France August 25, 1928.

My invention has for its object to assure the retention of nuts on bolts.

A particular object is to reduce in a very simple manner means by which a nut is prevented from working loose.

A device for locking nuts according to the invention has the characteristics set forth in the following description and especially in the claims annexed at the end hereof.

The preferred form of the invention is shown, by way of example, in the accompanying drawings, wherein:

Fig. 1 is a vertical section of a bolt and nut assemblage according to the invention;

Fig. 2 is a transverse section of this assemblage taken on the line 2—2 of Fig. 1;

Figs. 3 and 4 are, respectively, a view in elevation and a plan view of the bolt;

Figs. 5 and 6 are a plan view and a side view of the washer;

Figs. 7 and 8 show the spring ring in a plan view and as a section on the line 8—8 of Fig. 7, respectively; and Figs. 9 and 10 are a plan view and side view of the locking nut.

The jointing of the two parts $1'$ and $1^2$ shown in Fig. 1 is effected by means of the elements shown separately in the other figures.

A bolt 2 (Figs. 3 and 4) has a groove 3 lengthwise of its thread.

A washer 4 (Figs. 5 and 6) forming a stop piece has circumferential ratchet teeth 6 and an internal tongue 5 which engages in the groove 3 of the bolt 2.

A split ring 7 (Figs. 7 and 8) forming a spring clamp, with an inner diameter equal both to the diameter on the corners of the nut 9 and the outer diameter of the washer 4, is provided with an internal lug 8 which is cut out in such a way as to engage on the bottom of the ratchet teeth 6 of the washer 4.

A nut 9, (Figs. 9 and 10) has notches $10'$, $10^2$ on one of its faces in one of which the wide part of the lug 8 of the ring 7 (Figs. 7 and 8) can be engaged. This arrangement enables the narrow part of the lug 8 to cooperate with the ratchet teeth 6, but the wide part of the lug 8 does not leave the notch $10'$ or $10^2$ of the nut.

To join the two parts $1'$, $1^2$ (Figs. 1 and 2) by means of the aforesaid device the procedure is as follows:—

The bolt 2 is, in the ordinary way, put into the holes $12'$, $12^2$ in the two parts $1'$, $1^2$. The washer 4 is then placed on the threaded end of the bolt 2 with its tongue 5 engaging in the groove 3, by which means it is fixed on the bolt 2 against independent rotation. Ring 7 is then put on the nut 9, the wide part of the lug 8 being in one of the notches $10'$ or $10^2$. Finally the nut 9 is screwed on to the bolt, care being taken that the face with notches $10'$, $10^2$ is towards the washer 4, with the spring ring therebetween. When the narrow part of the lug 8 of the ring 7 comes into contact with the ratchet 6, it jumps over each tooth until the nut is fully tightened. When fully tightened the nut 9 cannot come loose; in fact rotation of the nut 9 on the bolt 2 in the opposite direction is entirely prevented by the spring ring 7, which is fixed to the nut 9 by the engagement with the notches 10 of the lug 8, the latter also being in engagement with one of the ratchet teeth 6 on the washer 4 which in turn is fixed to the bolt 2 by the tongue 5 being engaged with the groove 3.

Thus the two parts $1'$ and $1^2$ are firmly locked together by the bolt and nut, and the nut cannot work loose.

What I claim as my invention and desire to secure by Letters Patent is:

1. In a device for uniting two or more parts, a bolt, a nut adapted to be screwed on said bolt to insure the tightening of the said parts, said nut having notches in one of its faces, a stop-member in engagement with said bolt intermediate one of said parts and the bearing face of said nut, means opposing the free rotation of said stop-member, an elastic ring having a lug in engagement with one of the notches in said nut, said lug clearing said stop member upon the rotation of said nut in one direction, so as to permit the tightening of said nut, while upon the rotation of said nut in the other direction, said lug will abut against said stop-member thereby preventing the loosening of said nut.

2. In a device for uniting together two or more parts, a bolt, a nut screwed on said bolt insuring the tightening together of said parts, said nut having in one of its faces radial notches, a stop-member in engagement with said bolt intermediate one of said parts and the bearing face of said nut, means opposing the free rotation of said stop-member, an elastic ring bearing on said nut completely encircling the same and having a lug in engagement with one of the notches in said nut, said lug clearing said stop-member upon the rotation of said nut in one direction so as to permit the tightening of said nut while upon the rotation of said nut in the other direction, said lug abuts against said stop-member thereby preventing the loosening of said nut.

3. In a device for uniting together two or more parts, a bolt having a longitudinal groove, a nut screwed on said bolt insuring the tightening together of said parts, said nut having in one of its faces notches, a washer interposed between one of said parts and the bearing face of said nut and having a tongue in engagement with the groove in said bolt non-rotatively connecting said washer with said bolt, said washer having at its circumference ratchet teeth, an elastic ring having an inwardly bent lug directed toward the center and extending into one of the notches of said nut clearing said ratchet teeth while remaining in engagement with the notch in said nut upon the rotation of the same in one direction so as to permit the tightening of said nut, while upon the rotation of said nut in the other direction said lug abuts against one of said ratchet teeth thereby preventing the loosening of said nut.

In testimony whereof I have signed this specification.

HENRI JOSEPH FRELIN.